United States Patent [19]

Zona et al.

[11] 4,151,434
[45] Apr. 24, 1979

[54] CASTING ASSEMBLY FOR STATOR COILS AND METHOD

[75] Inventors: Michael R. Zona, McKeesport; Charles R. Ruffing, Edgewood; Paul S. Johrde, Franklin, all of Pa.

[73] Assignee: Westinghouse Electric Corp., Pittsburgh, Pa.

[21] Appl. No.: 785,383

[22] Filed: Apr. 7, 1977

Related U.S. Application Data

[62] Division of Ser. No. 683,117, May 4, 1976, Pat. No. 4,047,867.

[51] Int. Cl.² .......................... H02K 3/00; B29C 6/00
[52] U.S. Cl. ........................................ 310/71; 29/605; 264/219; 264/272; 264/299; 310/43; 310/260
[58] Field of Search ............... 264/271, 272, 259, 261, 264/267, 275, 299, 219; 29/605; 310/43, 71, 260

[56] References Cited

U.S. PATENT DOCUMENTS

| | | | |
|---|---|---|---|
| 3,151,260 | 9/1964 | MacCracken et al. | 310/260 |
| 3,555,316 | 1/1971 | Bleich | 310/260 |

*Primary Examiner*—W. E. Hoag
*Attorney, Agent, or Firm*—G. H. Telfer

[57] ABSTRACT

The terminal portion of a winding end turn conductor which projects from the core member of a dynamoelectric machine is encapsulated in an epoxy potting compound by means of a casting assembly which comprises a detachable conformable pad, a plastic sleeve mold, and a portable vise. The conformable pad is fitted about the terminal portion of the conductor to provide a temporary barrier to axial flow of the epoxy compound during casting. The plastic sleeve is disposed around the terminal portion in a spaced relationship therewith and in an abutting relation with the pad to provide a barrier to the radial flow of the epoxy compound during casting. Clamping means such as a portable vise is fitted about the conformable pad and is tightened to establish a compressive union at the interface of the conformable pad and the terminal portion of the conductor to prevent leakage. A pair of spring members hold the sleeve in abutting engagement with the surface of the conformable pad during the casting process. In a preferred embodiment, a sealing compound is applied to the interface of the pad and the sleeve and also between the pad and the terminal portion of the conductor to prevent leakage. After the epoxy compound has cured, the clamping means and detachable conformable pad are removed from the assembly and can be reused to encapsulate other conductors.

6 Claims, 9 Drawing Figures

CASTING ASSEMBLY FOR STATOR COILS AND METHOD

This is a division of application Ser. No. 683,117 filed May 4, 1976, now U.S. Pat. No. 4,047,867, issued Sept. 13, 1977.

BACKGROUND OF THE INVENTION

1. Field of the Invention

The present invention relates to the stator windings of large dynamoelectric machines such as hydro-generators, and more particularly, to the insulation of the series connected stator coil end turns of such machines.

2. Description of the Prior Art

The rating of hydro-generators has been increasing rapidly over the last few years. Single-turn coils with Roebel transposition of the conductor strands are most suited for these larger ratings. The series connected end turns of this type coil are necessarily large and carry full coil current. These connections may be made by brazing individual strands or groups of strands from adjacent coils together in a compact manner. A more convenient method is to braze one or two copper bars between adjacent coils.

Such connections in the past have been insulated by means of hand taping with an insulating tape. However, because the insulation procedure must often be accomplished in the power plant, and because of the limited access to the terminal portions of the series connected coil end turns, the conventional hand taping process is unsuitable. Furthermore, because the joints conduct full coil current an insulating structure providing improved heat transfer is desirable. Of course, a suitable insulation scheme for the brazed structure should be impervious to moisture and oil and should occupy a minimum of space in order to avoid interfering with ventilation, and should be suitable for application under field conditions with semi-skilled labor.

As an aid to further understanding of the general construction and use of epoxy encapsulated conductors in dynamoelectric machines, reference is made to the following examples of the prior art:

(1) U.S. Pat. No. 3,151,260, D. C. MacCracken, Jr. et al;
(2) U.S. Pat. No. 3,555,316, Donald D. Bleich;
(3) U.S. Pat. No. 3,123,729, R. Fagel; and
(4) U.S. Pat. No. 2,944,297, J. T. Maynard.

SUMMARY OF THE INVENTION

The invention provides for insulating the terminal portions of stator coil end turns of a large dynamoelectric machine in a manner which provides adequate mechanical reinforcement, effective electrical insulation, and improved heat transfer as compared with the hand-taped prior art arrangement. These objects and advantages are realized by a method and structure for encapsulating the terminal portion of a coil end turn which provides an extremely compact, encapsulated package. In accordance with the method of the invention, a detachable conformable pad is secured to a coil end turn terminal portion which is to be encapsulated. The pad includes radially extending side portions which circumscribe and extend transversely to the terminal portion of the coil end turn to provide a barrier to axial flow of a liquid potting compound. A sleeve member, which may also provide electrical insulation, is disposed about the terminal portion of the coil end turn in a spaced relationship therewith. The sleeve comprises a continuous, circumferentially extending side portion which is bounded by first and second open end portions, the sleeve providing a barrier to the radial flow of the liquid potting compound during casting. The sleeve is disposed in abutting engagement with the detachable pad to define a volume in combination therewith for receiving the liquid epoxy casting. A liquid potting compound casting material such as epoxy resin having good heat transfer properties and good electrical insulation properties when cured is cast into the sleeve until the end turn terminal portion is completely covered to a predetermined depth by the liquid epoxy. After the potting compound is cured to form a hardened mass of insulation surrounding the coil end turn portion, the detachable pad is removed from the assembly.

BRIEF DESCRIPTION OF THE DRAWINGS

The invention will be more fully understood from the following detailed description, taken in connection with the accompanying drawings, in which.

DESCRIPTION OF THE PREFERRED EMBODIMENTS

Figure 1:
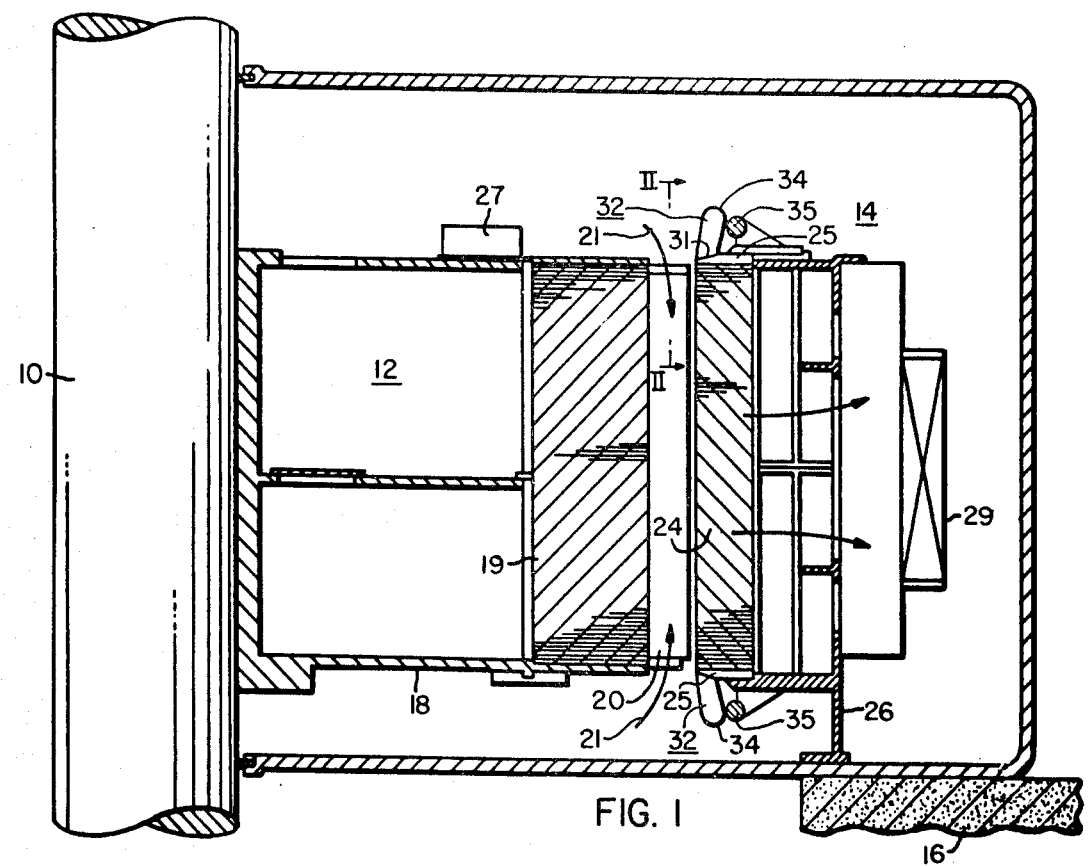
FIG. 1 is a vertical sectional view of a large hydro-generator having winding end turn portions encapsulated by the method of the present invention.

The invention is shown in FIG. 1 embodied within the stator core of a large vertical dynamoelectric machine suitable for use as a waterwheel driven generator. The machine has vertical shaft 10 carrying a rotor member 12 for cooperation with a stator 14 which is supported on a foundation 16 of any suitable type. The shaft 10 and the rotor 12 are supported on a thrust bearing (not shown) of the usual type and the overall construction of the machine may be of any usual or desired type. The rotor 12 consists of a spider portion 18 mounted on the shaft 10 which may be of any suitable or usual construction. A laminated rim 19 is carried on the spider portion 18 and salient poles 20 carrying field windings (not shown) are mounted in the usual manner on the rim 19. The rotor 12 may be of any suitable construction and may be cooled by its own ventilation system, either separately or in cooperation with that of the stator. The machine is shown as being cooled by air flowing axially through the inner polar spaces as indicated by the arrows 21. Ventilating air is circulated through the machine by any desired means which is shown as a centrifugal blower consisting of a plurality of blades 27 mounted on the rotor. Air flows from the blower in the path indicated by the arrows 21 and through coolers 29, which may be the usual type, any necessary number of coolers 29 being provided about the circumference of the machine.

The stator 14 comprises a laminated stator core 24 supported between end plates 25 and a frame 26. The stator core 24 is of laminated construction and is built up of the usual punchings to form a cylindrical core having a central bore therethrough with teeth (not shown) extending longitudinally of the bore to form slots 31 between them for the reception of a stator winding 32 of any suitable type consisting of a plurality of winding conductors which constitute half coils connected at their terminal end portions 34 to form complete coils and a complete stator winding. The terminal end portions 34 are suitably braced by a bracing ring 35.

Figure 2:
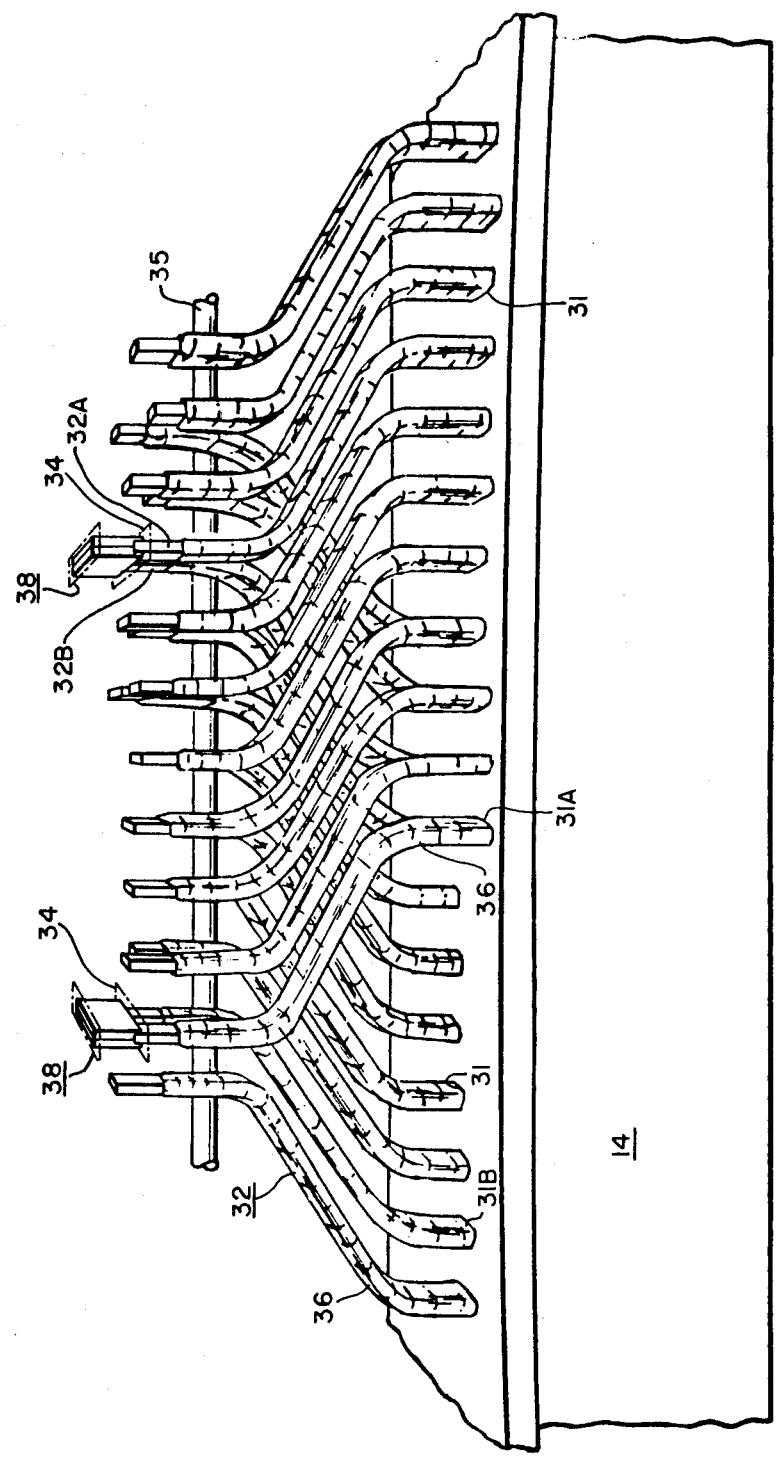
FIG. 2 is a fragmentary view of a portion of the stator of the generator of FIG. 1 taken along the lines II—II.

In the illustrative embodiment shown in FIG. 1 and FIG. 2, which is typical of large machines with heavy load currents in the stator winding, each of the conductors comprising the winding 32 consists of two columns of conductor strands (not shown) which are transposed in any desired manner such as the well-known Roebel transposition. The portions of the conductors comprising the winding 32 which lie in the slots 31 of the stator core 14 are, of course, enclosed in the usual heavy ground insulation 36 which extends beyond the core almost to the end of the conductors as can be seen in FIG. 2, for example.

As previously described, each of the stator winding conductors 32 extends beyond the stator core 14 at each end thereof, and each end of each conductor is formed in the usual manner to extend around the core into position for connection to the other end of another conductor lying in a different slot (from slot 31A to slot 31B, for example). The extreme terminal ends 32A, 32B of each such pair of conductors are disposed adjacent each other as shown in FIG. 2. The strands of each conductor are transposed within the slot portion, as previously described, and are electrically and mechanically joined together at their terminal end turn portions by means of brazed connections 38. The terminal portions of the adjacent coils are connected electrically and mechanically to form a series connected coil.

Figure 3:
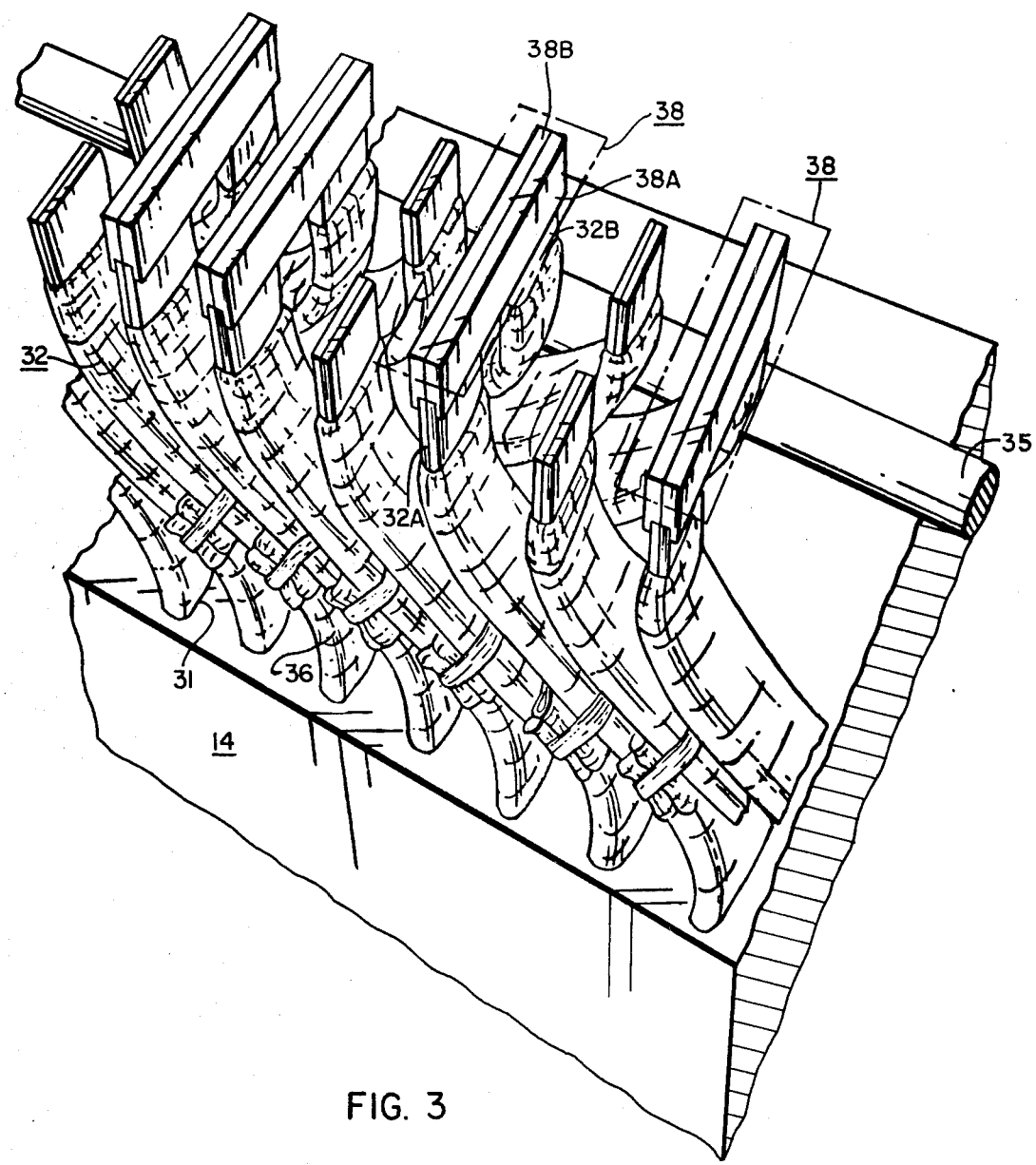
FIG. 3 is an isometric view of the stator shown in FIG. 2 which illustrates a brazed connection for the terminal portions of coil end turns which project from the stator core.

The brazed connection 38 shown in FIG. 3 comprises a pair of brazing bars 38A and 38B which are preferably composed of copper. As previously explained in prior art practice, these terminal coil end turn portions in some applications are connected by conventional strand joints and thereafter insulated by hand taping. However, according to the teachings of the present invention, the conductor terminal end portions 32A, 32B which are series connected by the brazed joint 38 are encapsulated in a liquid potting compound 39 (FIG. 6) instead of being hand taped with electrical insulating tape. The encapsulation provided by the method and structure of the present invention provides excellent electrical insulation and heat transfer properties and is physically robust and compact so that it does not interfere with ventilation and further provides additional mechanical support for the end connections.

Figure 4:
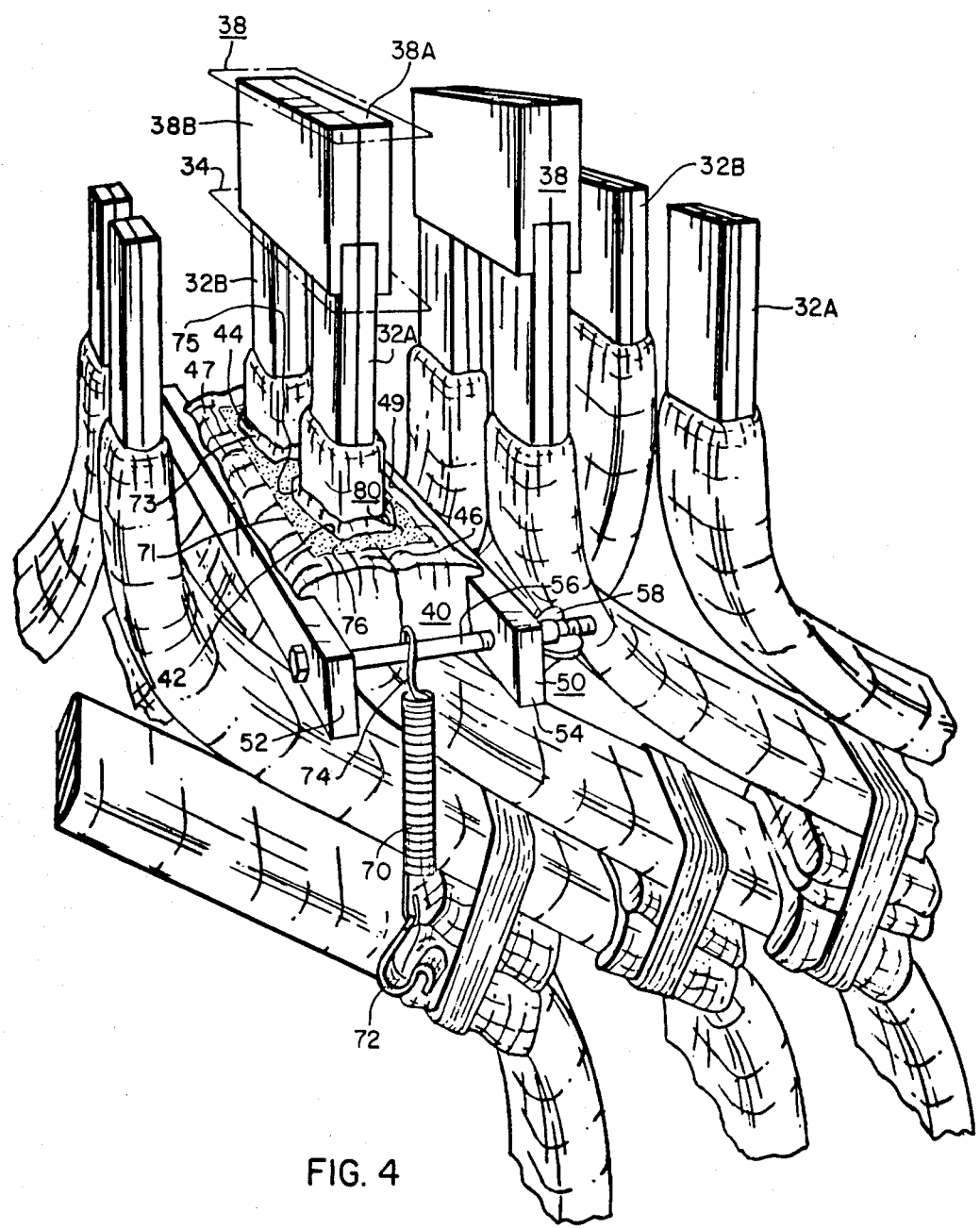
FIG. 4 is an enlarged view of a portion of the winding assembly illustrated in FIG. 3 in which a casting assembly constructed according to the teachings of the present invention is shown partially assembled.

The first step in the encapsulation process of the present invention is illustrated in FIG. 4. As there shown, a pad 40 of a conformable material such as polyethylene foam is disposed about the projecting terminal portions of the coils 32A and 32B. Other conformable materials such as spun glass fiber may be used to good advantage. However, the material selected for the conformable pads 40 should be compressible and slightly plastic so that any void which may exist between the pad 40 and the conductors 32A and 32B will be filled (to prevent leakage of the liquid potting compound 39) by the conformable material of the pad 40 when it is compressed about them.

Figure 7A:
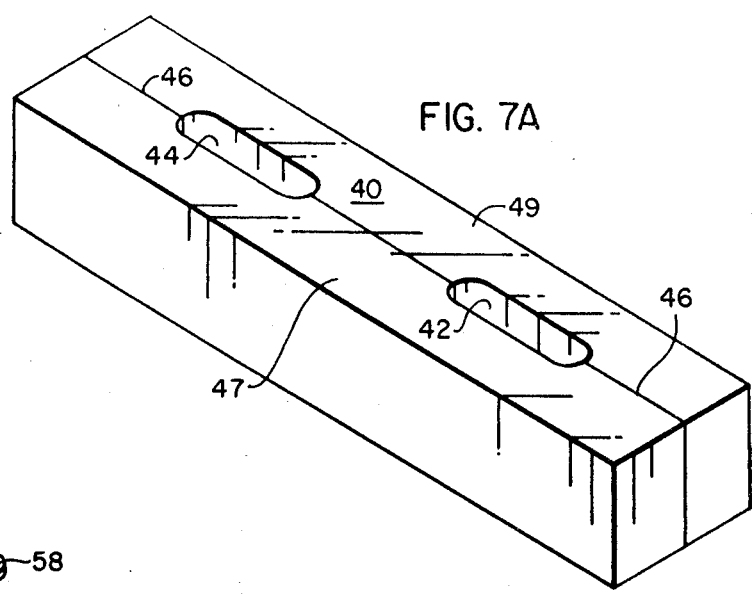
FIG. 7A is an isometric view which illustrates the construction of the detachable, conformable pad shown in FIGS. 5 and 6.
Figure 7C:
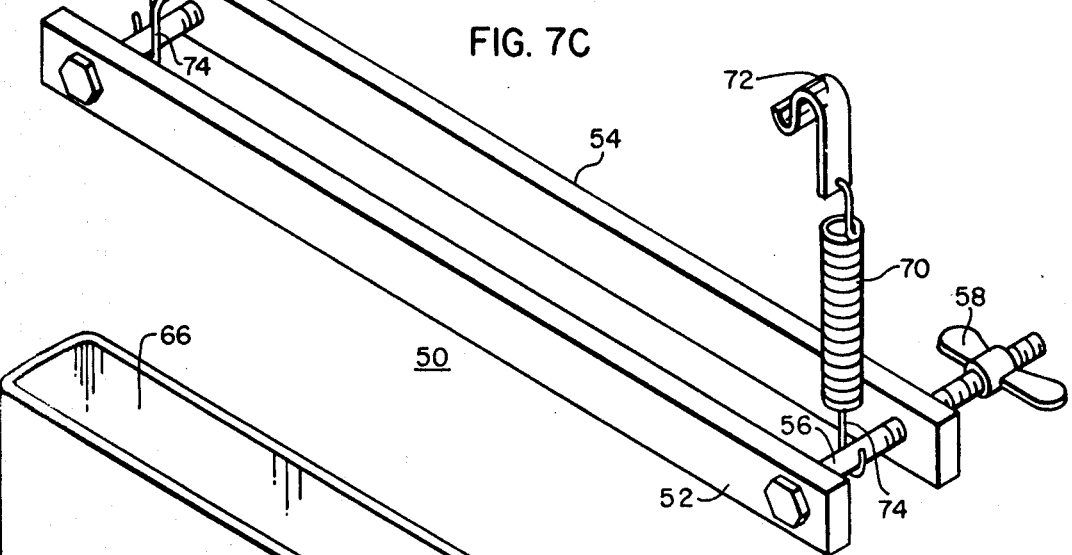
FIG. 7B is an isometric view which illustrates the construction of the sleeve which is shown in FIGS. 5 and 6; and, FIG. 7C is an isometric view which illustrates the construction of the portable vise and spring members which are shown in FIGS. 5 and 6.

The conformable pad 40 is secured to the terminal portions 32A and 32B of the winding 32 and includes openings 42 and 44 (FIGS. 4, 7A) which are prefabricated to provide a close fit between the sides of the conformable pad 40 and the projecting end turn portions. The conformable pad 40 is severed longitudinally along the line 46 so that it may be easily and quickly fitted around the terminal portions 32A and 32B of the winding 32. The conformable pad 40 has radially extending side portions 47, 49 which circumscribe and extend transversely with respect to the coil end turn terminal portions 32A and 32B to provide a barrier to the flow of the liquid potting compound 39 when it is cast.

A portable vise or clamp 50 is used to provide a compressive force on the conformable pad 40 to force it into a tight compressive union with the terminal coil portions 32A and 32B to seal the interface between the terminal coil portions and the pad. The vise or clamps 50 may assume any suitable construction, and is shown in FIG. 4 as comprising a pair of jaws or clamping bars 52 and 54 which are connected on either end by means of screw bolts 56 and wing nuts 58.

Figure 5:
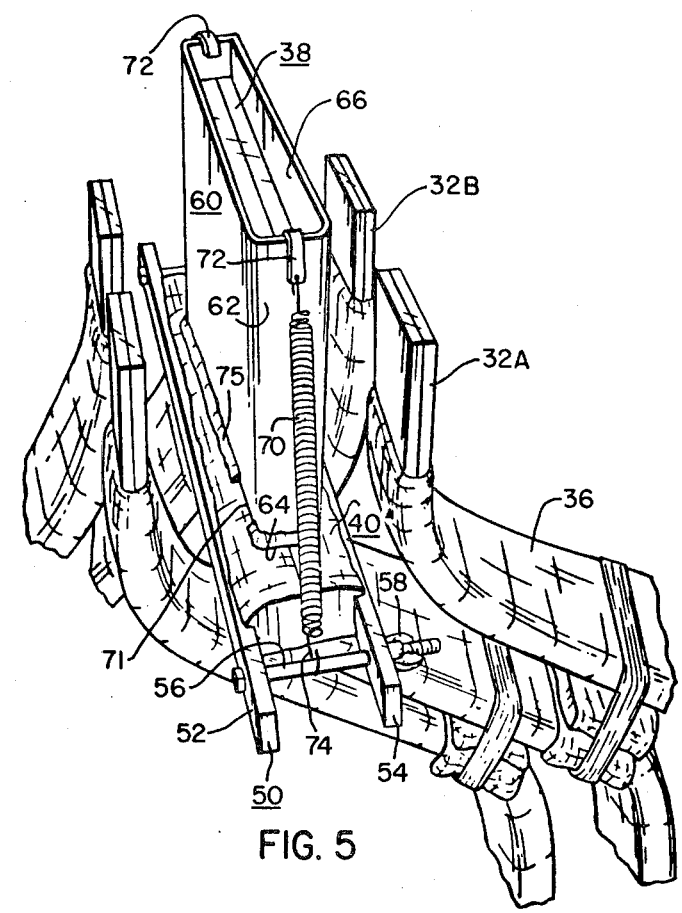
FIG. 5 is a view similar to FIG. 4 in which the casting assembly is completely assembled.
Figure 7B:
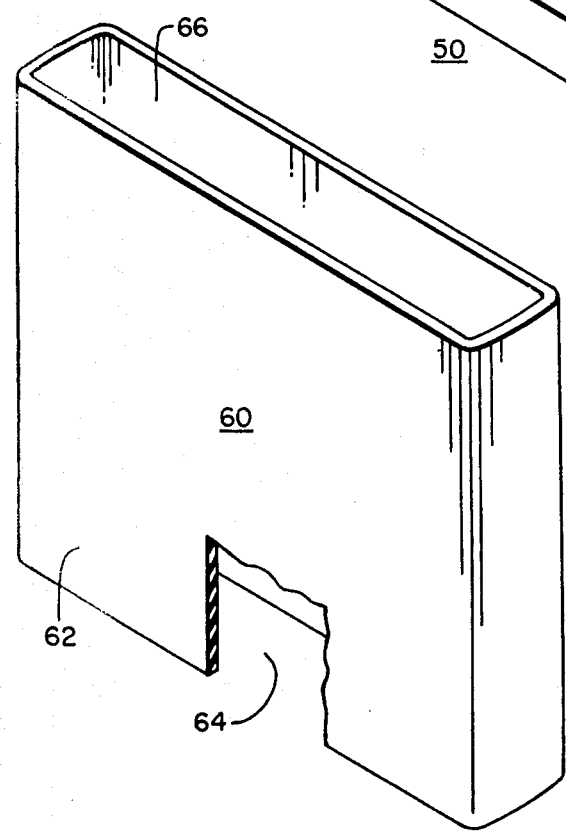

The casting operation is made possible by a sleeve mold 60 which is shown assembled to the conformable pad 40 in FIGS. 5 and 7B of the drawing. The sleeve 60 comprises a continuous, circumferentially extending side portion 62 which is bounded by first and second open end portions 64 and 66. The open end portion 64 of the sleeve 60 is disposed in abutting engagement with the pad 40 with its side portion 62 being radially spaced from the end terminal portions 32A and 32B and also being radially spaced from the brazed electrical connection 38. The combination of the sleeve 60 and the detachable pad 40 provides a receptacle or a mold for containing the liquid potting compound 39 while it cures. The sleeve 60 is preferably constructed from a dielectric material such as polyester glass to provide electrical insulation for the end turn conductors.

As discussed above, the portable vise 50 holds the detachable conformable pad 40 in compressive engagement with the end turn terminal portions 32A and 32B to substantially fill any void which may exist between the terminal portions 32A, 32B and the pad 40 so that leakage of the liquid potting compound 39 is prevented.

Also illustrated in FIG. 5 is spring means 70 which holds the sleeve 60 against the pad 40 to establish a compressive union at the interface 71 of the first open end portion 64 of the sleeve 60 and the conformable pad 40. The spring 70 is shown attached to the second open end portion 66 of the sleeve 60 by means of a clip 72 while the opposite end of the spring is shown attached by means of an extension 74 of the spring 70 which is curled around the screw bolt 56 of the portable vise 50. An identical spring assembly is attached between the vise assembly and the sleeve at the opposite end of the sleeve. Other fastening arrangements which are easily assembled and disassembled may be used to good advantage.

In some instances, it may be desirable to seal the interface 71 (FIG. 4, FIG. 5) between the sleeve 60 and the conformable pad 40 to prevent leakage of the liquid potting compound. Also, it may be desirable to seal the interface 73 (FIGS. 4, 5) between the conformable pad 40 and the end turn terminal portions 32A and 32B for the same reason. This is accomplished according to present invention by applying a layer 75 of a sealing compound such as butyl rubber to the interface areas 71, 73 where additional sealing is desired.

Because it is desirable to remove the conformable pad 40 after the casting has cured, the exposed surface 76 (FIG. 4) of the pad 40 which is bounded by the abutting first open end portion 64 of the sleeve 60 is treated with a quick release material 80 which has properties which inhibit the adhesion of the liquid epoxy casting material 39 to the pad 40 so that the pad may be removed without causing its destruction. This is accomplished according to the present invention by applying a thin layer of a release agent 80 (FIG. 4) such as Dow Corning 107 on the surface of the pad 40 to prevent adhesion of the pad 40 to the lower portion 82 (FIG. 6) of the cured potting compound 39.

In order to ensure uniform heat transfer from the brazed connection, the liquid potting compound 39 should be distributed about the connection uniformly. Therefore, it is preferred that the sleeve 60 be substantially centered about the brazed connection 38 and the terminal end turn portions 32A and 32B. The centering of the sleeve 60 can be accomplished in most cases manually by simple inspection. However, in some cases, it may be necessary to use some mechanical spacing means interposed between the sleeve and the terminal portions to maintain the sleeve in a substantially centered relationship.

Figure 6:
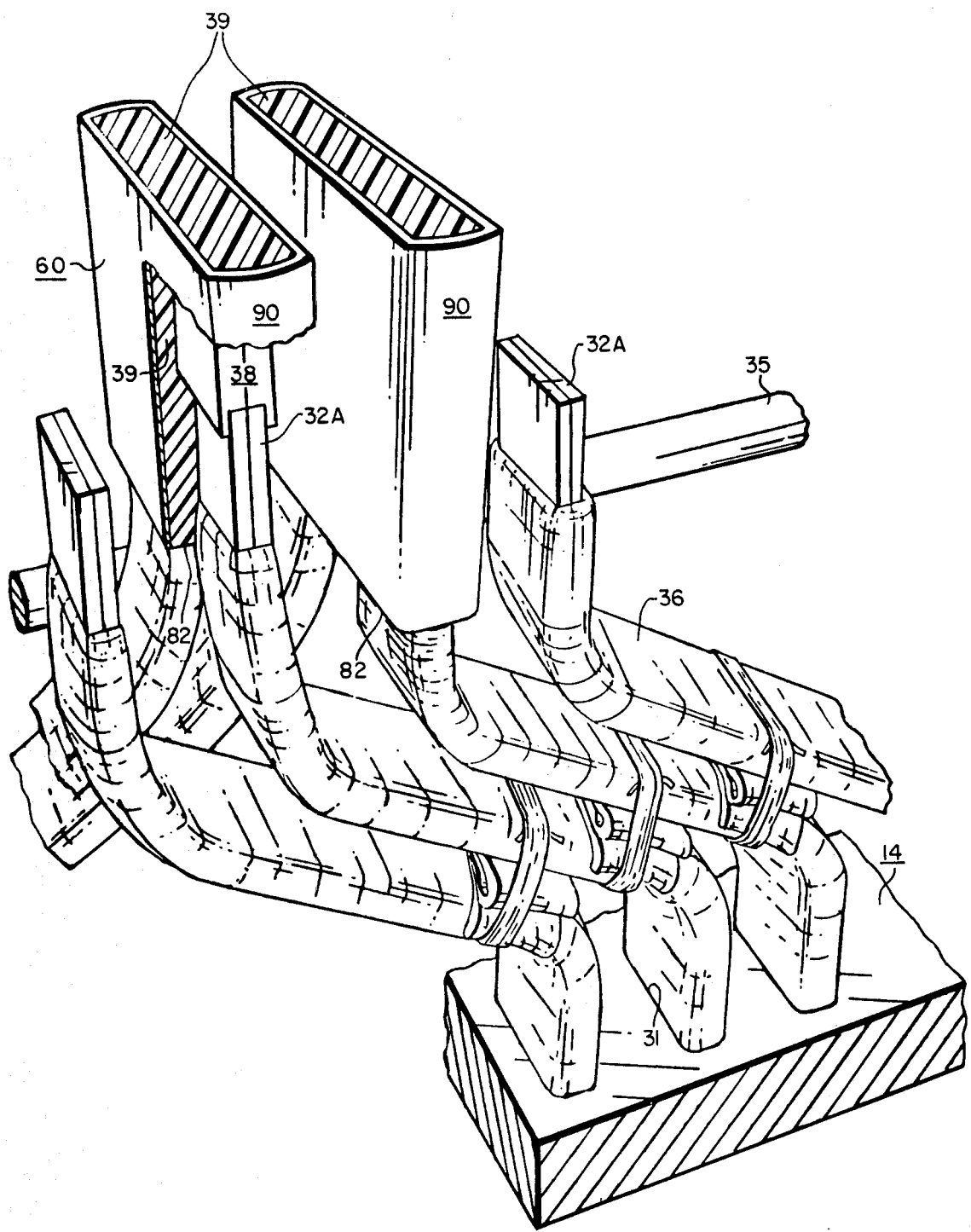
FIG. 6 is a view similar to FIG. 5 in which the finished encapsulation is illustrated.

A brazed series connection 90 which has been encapsulated according to the teachings of the present invention is illustrated in FIG. 6 of the drawings. In a preferred embodiment of the invention, the potting compound 39 comprises an easily poured silica-filled epoxy mixture of approximately equal parts by weight of silica and resin together with a suitable amount of a curing agent.

The method and apparatus discussed above provides an insulated coil end encapsulated construction which is adequately supported mechanically in a manner to substantially prevent failures caused by vibration and fatigue, the conductor strands being solidly bonded together by the brazed connection and encapsulated in the hardened epoxy potting compound. The sleeve 60 provides effective insulation and is compact so that it does not interfere with the ventilation of the series connected end turn portions. The construction is such that it can be applied quickly and easily by unskilled labor under field conditions. It is especially suitable for use in winding configurations where access would be too restricted for the use of hand taping as utilized in the prior art. The cast epoxy compound provides both electrical insulation and improved heat transfer from the brazed series connection as compared to the conventional hand taped assembly.

While certain preferred materials have been described for the purpose of illustration, it should be understood that other suitable insulating materials and resins may be used if desired. The particular details of construction shown are, of course, only illustrative and other equivalent structures may be utilized without departing from the scope of the invention.

We claim as our invention:

1. A method of encapsulating a terminal portion of a coil end turn conductor which projects from the core of a dynamoelectric machine, said method comprising:

securing a pad to said terminal portion, said pad having radially extending side portions which circumscribe and extend transversely to said terminal portion to provide a barrier to the axial flow of a fluid relative to said terminal portion;

disposing a sleeve around said terminal portion in a spaced relation therewith, said sleeve having a continuous, circumferentially extending side portion bounded by said first and second open end portions, said sleeve providing a barrier to the radial flow of a fluid relative to said terminal portion, said first open end portion of said sleeve being disposed in abutting engagement with said pad, and said side portion being radially spaced from said terminal portion;

casting a liquid potting compound into said sleeve to fill the volume defined by the combination of said pad and said sleeve whereby said terminal portion is covered by said liquid potting compound; and, curing said liquid potting compound to form a hardened mass surrounding said coil end turn portion.

2. The method as defined in claim 1, including the step of sealing the interface of said pad and said first open end portion of said sleeve and sealing the interface of said pad and said end turn terminal portions with a sealing compound to prevent fluid leakage therethrough prior to the step of casting said insulating material.

3. The method as defined in claim 1, including the step of removing said pad from said end turn terminal portion after said insulating material has been cured.

4. The method as defined in claim 1, wherein said pad is a block of conformable material having an opening suitable for registration with said projecting coil end turn terminal portion, the step of securing said pad to said terminal portion being carried out by inserting said terminal into said opening and applying a compressive force to said conformable pad whereby a compressive union of said pad with said terminal portion is established, said force of compression being sufficient to cause the conformable material of said pad to substantially fill any void which may exist between said coil end terminal portion and said pad.

5. The method as defined in claim 4, including the step of forcing said sleeve against said pad to establish a compressive union at the interface of said first open end portion of said sleeve and said conformable pad.

6. In a core member of a dynamoelectric machine having a winding supported by said core, said winding including a coil end turn terminal portion which projects from said core, said terminal portion being encapsulated in a potting compound according to the method defined in claim 1.

* * * * *